INVENTOR
HARRY A. TOULMIN, JR.

BY Toulmin & Toulmin

ATTORNEYS

March 5, 1963  H. A. TOULMIN, JR  3,079,761
METHOD AND APPARATUS FOR DEHYDRATION
Filed April 27, 1959  2 Sheets-Sheet 2
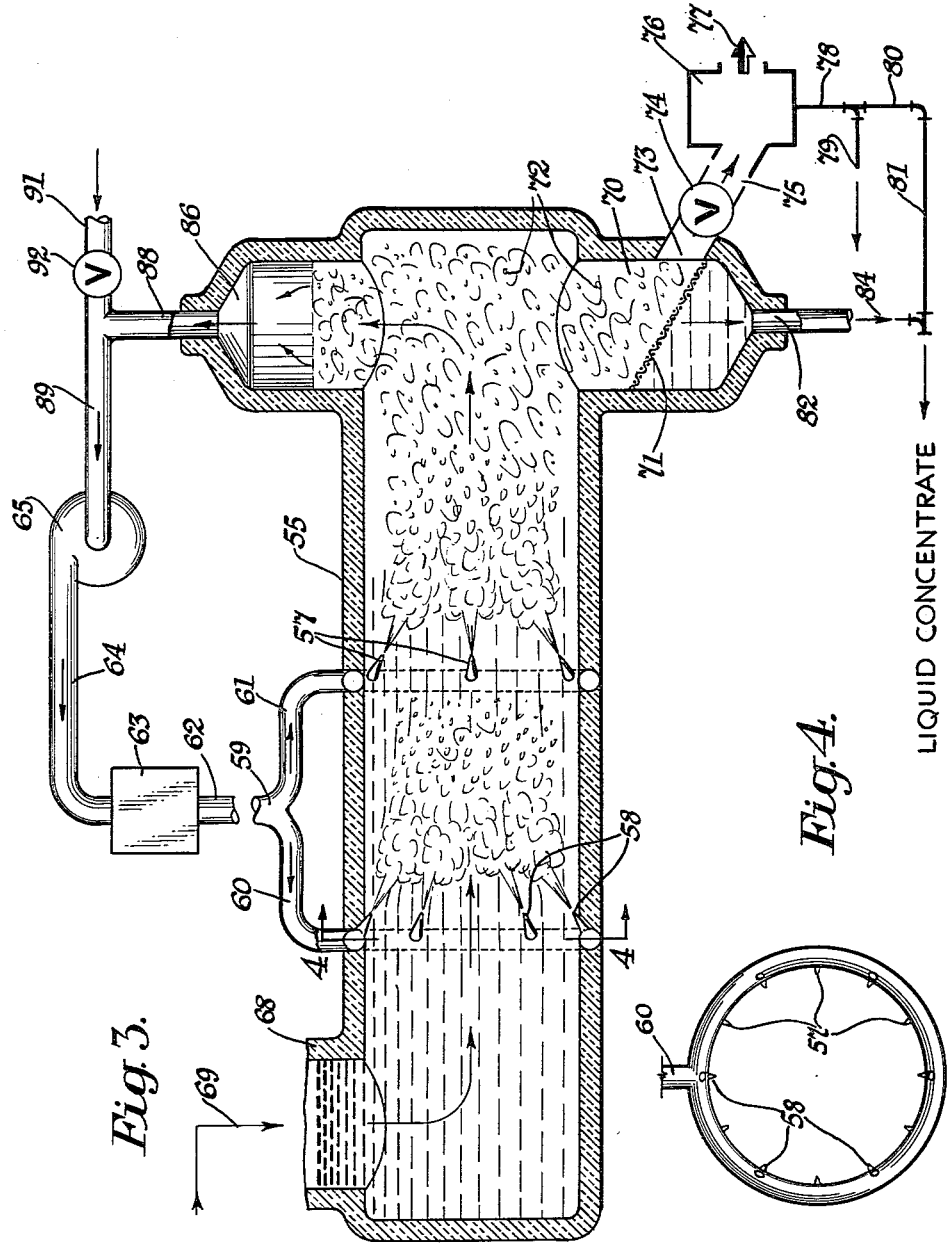
INVENTOR
HARRY A. TOULMIN, JR.
BY Toulmin & Toulmin
ATTORNEYS United States Patent Office 3,079,761
Patented Mar. 5, 1963

3,079,761
METHOD AND APPARATUS FOR DEHYDRATION
Harry A. Toulmin, Jr., Dayton, Ohio, assignor, by mesne assignments, to Union Carbide Corporation, New York, N.Y., a corporation of New York
Filed Apr. 27, 1959, Ser. No. 809,131
1 Claim. (Cl. 62—58)

This invention relates to concentrates, and more particularly to an improved method and apparatus for concentrating solutions containing solids in suspension. The invention provides a simplified apparatus and method for producing liquid concentrates wherein use is made of an inert gaseous refrigerant to cause the solvent to crystallize out of the solution.

The invention is especially useful for producing concentrates of juices, and the like, which contain volatile aromatics and are heat-sensitive. Examples of such substances which are adapted to be concentrated by the process of this invention comprise fruit and vegetable juices, milk, beer, syrups and the like which contain water as a principal constituent.

In prior art processes for producing concentrates of the character described, it has been the practice in a number of methods to subject the aqueous solution to heat or vacuum, or both, to evaporate and separate the water from aqueous solutions. Such processes, however, remove volatile flavoring aromatics which alters the original or natural flavor and aroma of the material thus treated which is undesirable. Further, the application of heat to heat-sensitive substances, such as fruit and vegetable juices, is detrimental in that it brings about not only volatilization but the reaction of the material with occluded air and oxygen so that the concentrate recovered does not have the same properties as the original unheated material, and even when the water removed during the treatment is replaced, the resultant product does not have the same flavor and physical properties of the original material.

In still another process, the material being concentrated is subjected to a series of successive and repeated freezing treatments. The material, such as a fruit juice, is introduced into a tank or container and refrigerated to freeze out a portion of the water as ice crystals, and the resultant slushy mass of mother liquor and ice crystals centrifuged to separate the ice particles after which the mother liquor is transferred to the next succeeding freezing tank and the freezing treatment repeated at a few degrees lower temperature whereby additional water at that solute concentration is frozen out as ice crystals. The treatment is thus continued through additional freezing tanks until a final concentrate of the desired Brix is obtained. While such a process is efficaceous in removing the water, the operation requires extensive equipment and facilities for handling and storing relatively large volumes of solution which, of course, increase the cost of operating the process commercially.

The present invention overcomes the disadvantages of prior processes, at least to a large extent, and provides a simplified apparatus and method for producing concentrated solutions of the character described, and wherein the water originally present in the material is removed solely by freezing and without the use of heat, vacuum, or successive freezing treatments as afore-described.

The principal object of the invention is to provide a new and simplified method for concentrating solutions and which will overcome the drawbacks inherent in conventional methods heretofore practiced.

It is a further object of this invention to provide a simplified method and apparatus for freezing water out of aqueous solutions or suspensions containing water whereby a concentrate is recovered which is of high quality and may readily be re-constituted by the addition of water.

It is a further object of the invention to provide an apparatus and method for concentrating fruit and/or vegetable juices, and especially citrus juices, without the application of heat or vacuum or multiple freezing treatments, the freezing being brought about by a gaseous refrigerant in direct contact with the liquid material to be concentrated. In this manner, water is frozen forming fine ice crystals which are removed from the solution. The process is adapted for operation as a continuous or discontinuous method as desired.

It is a further object of the invention to provide an apparatus and method for concentrating solutions and suspensions wherein water constitutes the solvent or is one of the principal constituents, and which water is frozen out as ice crystals and a liquid concentrate recovered containing substantially all of the original constituents except water.

These and other objects and advantages of the invention will become clear from the following description and reference to the accompanying drawings, in which—

Figures 1, 2:
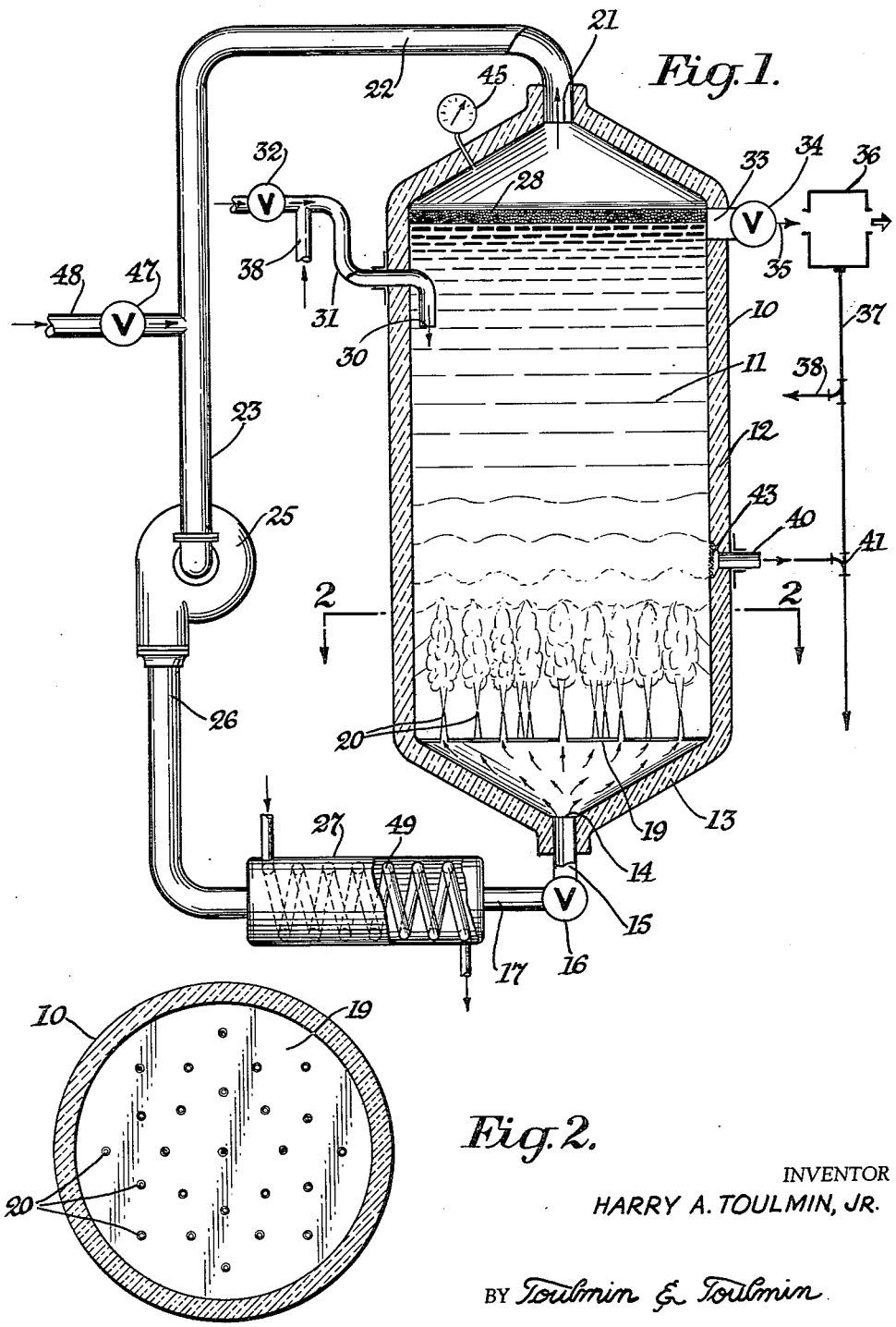
FIGURE 1 is a vertical sectional view of an apparatus suitable for carrying out the process of the invention, certain of the parts being illustrated in elevation and other parts in section in the interest of clearness.
FIGURE 2 is a view in cross section taken substantially on the line 2—2 of FIGURE 1, and looking in the direction of the arrows.

FIGURE 3 is a modification illustrating apparatus for freeze dehydration of water containing materials in which the liquid is flowed horizontally through a freeze dehydrating chamber and subjected to jets of refrigerated gas, the apparatus being shown partly in section and parts diagrammatically to illustrate the system; and FIGURE 4 is a cross sectional view taken substantially on the line 4—4 of FIGURE 3, and looking in the direction of the arrows.

Referring more particularly to the drawings, FIGURE 1 shows a tank 10 which is adapted to be filled with the material 11, for example citrus juice, from which a concentrate is to be prepared. The tank 10 comprises heat insulated walls 12, the bottom portion 13 being funnel-shaped and provided with a central opening 14 in which is fitted a conduit 15 which in turn is connected through valve 16 to a conduit 17.

Tank 10 comprises a manifold 19, and nozzles 20, which are arranged in the bottom of the tank. The nozzles 20 are spaced radially about the bottom of the tank, as illustrated in FIGURE 2. At the top of the tank 10 an opening 21 is provided which is connected through a conduit 22 and thence through conduit 23 to the inlet of a blower 25. The outlet from the blower 25 is connected through pipe 26 to a heat exchange 27, and to conduit 17. In this arrangement, refrigerating gas, which is supplied to the manifold 19 and discharged from nozzles 20, as shown by the arrows in FIGURE 1, flows upward through the body of the liquid being treated, such as fruit or vegetable juice for example, which is being concentrated.

The refrigerant gas discharged from the nozzles 20 and which passes upward through the body of the material to be refrigerated and brings about freezing of the water present as ice crystals, and which being lighter than the liquid, float and are carried mechanically to the surface of the liquid near the top of the tank, as shown at 28. Fresh material is introduced into the tank 10 through an inlet 30 connected to a conduit 31. The inlet opening 30 is positioned below the surface of the liquid being treated in the tank to prevent interference and clogging of the same by ice crystals. Conduit 31 is S-shaped and preferably extends upwardly as shown in FIGURE 1, whereby liquid and ice are prevented from flowing back from the tank 10. A valve 32 is provided in the inlet line 31 for controlling the flow of juice therethrough.

For discharging the ice crystals from the top of the tank there is provided an outlet opening 33 which discharge outlet is controlled by a valve 34. The discharge outlet 33 communicates through a line 35 to a centrifuge 36, as illustrated diagrammatically in FIGURE 1, and whereby the ice is separated from the slushy mass of ice crystals and liquid. The latter upon separation of the ice crystals, is returned through lines 37 and 38 to the inlet line 31. Alternatively the liquid may be connected to the outlet opening conduit 40, as indicated at 41 in FIGURE 1. To prevent ice particles from interfering with the outlet conduit opening 40, a screen 43 is provided.

By regulating the pressure of the gas flowing through the nozzles, the freezing of the solution may be controlled.

A pressure gauge 45 is provided at the top of the tank and wherein the same can be observed and the system regulated so that the pressure will be substantially atmospheric or slightly above.

The gaseous refrigerant utilized comprises nitrogen, carbon dioxide, helium, argon, crypton or the like inert gas which is non-oxidizing and does not have a detrimental effect on the materials being treated.

Additional gaseous refrigerant may be admitted to the system as needed by opening valve 47 in line 48 which is suitably connected to a refrigerant source. The heat exchanger 27 is provided with inner freezing coils 49 through which a refrigerant, such as brine, is circulated to maintain the temperature of the refrigerant gas low to cause freezing out of the water of the juice as ice crystals.

During operation of the freeze dehydration system, the juice being treated in the tank 10 is maintained thoroughly agitated by the gas refrigerant which is forced directly into the juice. The agitation afforded by the gaseous refrigerant prevents ice from forming on the walls or screen 43 so that there is no need for employing mechanically operated stirring mechanism, as has been the practice heretofore in freeze dehydrating apparatus. In operation, the temperature of the refrigerant gas flowing from the discharge nozzles 20 is maintained from 5° to 7° F. below the freezing point of the solution or juice being freeze dehydrated.

The starting temperature, for example in the case of orange juice and using nitrogen as the refrigerant gas, the same is introduced at a temperature of $-14°$ F., and then after five to ten minutes treatment of the juice at this temperature, the nitrogen refrigerant gas is lowered gradually, and at a substantially constant rate of 5 to 7° F. per minute until substantially all of the water has been frozen out as ice crystals, and a juice concentrate of the desired Brix obtained. A concentrate having a Brix of from 40 to 65% may thus be obtained by the process of the invention.

The process may be carried out as a continuous or batch type operation. In batch operation the juice is treated to a series of successive freezing stages. For example, starting with a freezing treatment using gas refrigerant at 14° F., each succeeding stage the refrigerant gas temperature is lowered approximately 70° F. and the freezing carried out. After each freezing stage, the ice is removed and the next freezing stage initiated. As the concentrate becomes more viscous the pressure of the refrigerant gas is raised to force the gas into the material. Due to the provision of a closed system, however, the pressure at the top of the tank 10 is kept substantially at atmospheric or above in order to retain the volatile aromatics in the juice concentrate.

The volume of refrigerant gas forced through the juice or solution being freeze dehydrated varies depending upon the volume of material being treated. In general refrigerant gas is introduced into the juice within a range of 10 to 50 cu. ft. of refrigerant gas per minute per 50 gallons of juice or liquid material treated. The greater the percentage content of water present in the material being freeze concentrated the slower the introduction rate of refrigerant gas. This prevents solidification of the mass, or formation of large ice particles which is undesirable.

To initiate the formation of ice crystals and prevent supercooling of the liquid material being treated, there is preferably added a small amount of the material which contains seed ice crystals. In general, however, this addition of seed ice crystals may be dispensed with due to the presence of suspended particles which permit the formation of nuclei at the freezing temperature employed. Preferably the juice or liquid being concentrated is pre-cooled to approximately 32° F. before being introduced into the freezing tank 10. This pre-cooling prevents the tendency to form large size ice crystals. By operating the system at the freezing temperature of refrigerant gas between about 14° F. and $-7°$ F. to $-14°$ F., the ice crystals formed are very small, and such particles being on the order of 0.0000002 to 0.0000008 centimeter in radius. Such finely divided ice crystals are substantially free of occluded mother liquor or juice being freeze dehydrated.

In the modification illustrated in FIGURES 3 and 4, a freeze dehydrating chamber 55 is provided with heat insulated walls similar as in the freeze dehydrating container 10 of FIGURE 1. In this modification the nozzles 57 and 58 are provided in a spaced relationship lengthwise of the freeze dehydrating chamber, as shown. A manifold conduit 59 is connected to the nozzles 57 and 58 through branch lines 60 and 61 respectively. The manifold 59 is in turn connected through lines 62 to a heat exchange 63 which in turn is connected through conduit 64 to a blower 65.

The refrigerant gas, as in the apparatus of FIGURE 1, is introduced into the body of the liquid being freeze dehydrated at high velocity. A linear velocity at the discharge nozzle of the gas is preferably in the range of 50 to 100 feet per second depending upon the viscosity of the liquid material treated.

The freeze dehydrating container 55 is provided with an inlet opening 68 in which liquid material containing water which is to be freeze dehydrated is introduced, as shown by the arrows at 69, and which liquid flows to the right as shown in FIGURE 3 through the container 55. At the opposite end of the freeze dehydrating container 55 in the lowermost section an outlet chamber 70 is provided in which there is mounted a screen 71. This screen, on which is collected the ice particles 72 is arranged in sloping relationship and substantially diagonally across the chamber 70, the lower end being disposed adjacent to the discharge opening 73 whereby the mushy mass of ice crystals and mother liquor is discharged to a centrifuge 76. This opening 73 is controlled by a valve 74 which when open permits the ice crystals 72 to be drawn off over the screen 71 which prevents ice crystals from passing down into chamber 70, the same being passed through line 75 to the centrifuge 76. The ice is separated and conducted away as at 77 and the recovered liquid is discharged through line 78 and either returned to the inlet 78 through line 79 or the liquid is carried through lines 80 and 81 and combined with the liquid which passes through the screen 71 and is discharged through an opening 82 in the bottom of chamber 70 and which is drawn off as at 84.

The freeze dehydrating container 55 is provided with a gas collecting chamber or dome 86 and wherein the refrigerated gas is collected, as shown by the arrows and is drawn off through a conduit 88 and thence the return conduit 89 which is connected to the inlet opening of the blower 65. In this arrangement the refrigerated gas after passing through the liquid material is collected and returned back through the system similarly as in the apparatus shown in FIGURE 1.

Where additional refrigerant is required to be added, the same is introduced through a line 91 which is controlled by a valve 92.

The method of freeze dehydrating in accordance with the invention is adapted for treating water bearing materials, and whereby the water is frozen out as fine ice crystals. This is achieved by introducing jets of refrigerated inert gas into the liquid material, the gas being at sufficiently low temperature to cause the water present to freeze forming ice crystals throughout the body of the liquid. The refrigerated, low temperature gas, which preferably is blown into the liquid mass from nozzles as high speed jets of inert gas, performs the dual function of (1) agitating the liquid mass, and (2) causing water to freeze, concurrently while being thoroughly agitated, in fine ice crystals. Upon separation of the ice crystals from the slushy liquid ice mass a liquid concentrate is recovered which is substantially free or of low water content. An added advantage of the process is gained by reason of the agitation as a result of the jet gas stream action in that there is no tendency of ice crystals to cling to the walls of the freezing container.

During the freezing treatment, heat is absorbed from the liquid material being treated due to the expansion of the refrigerant gas within the body of the liquid material. After passing through the liquid material the gas is recovered and pressurized and cooled then recirculated through the liquid material.

Inasmuch as different materials have different initial congealing temperatures, the temperature of treatment to suit the particular liquid material to be freeze dehydrated or concentrated is used. The freezing temperature of the refrigerant in each case can be readily determined by a trial run on a small batch. Various temperatures at which ice crystals form may be used. Further, the refrigerant gas employed in a given case will depend upon the material being freeze dehydrated and the absorptive properties with respect to the refrigerant gas. Where a carbonated liquid concentrate is desired, carbon dioxide gaseous refrigerant is used, whereas if no carbonation is desired, then nitrogen, helium or the like gas is employed. Suitable pressure and flow regulators will, of course, be employed as required to control and regulate the flow of refrigerant gas.

In the freeze dehydration of carbonated products, for example beer, whiskey, wine, soft drinks and the like, carbon dioxide refrigerant gas is preferably used. A portion of the gas is absorbed or dissolved in the body of the liquid while at the same time, due to the temperature of the gas, water is caused to freeze out as ice crystals and which are separated from the remaining liquid to recover a concentrate containing carbon dioxide. A dual effect is thus obtained in that the carbon dioxide performs the function of causing water to freeze into ice crystals and to produce a concentrate containing carbon dioxide which protects the concentrate when the same is bottled or canned by releasing carbon dioxide into the upper space above the liquid which fills the container and prevents air from coming in contact and admixing with the liquid.

In the case of concentrating and preserving juices such as apple juice and the like as in the production of cider, the same may be preserved for long periods of time by freeze dehydrating the juice using carbon dioxide or nitrogen and which gas is released into the upper portion of a container to protect the juice from contact with air.

In the freeze dehydration of milk, citrus juices and vegetable juices, nitrogen gas is preferably used as the inert refrigerant gas. Utilizing jets of nitrogen discharged into milk, which nitrogen is at a temperature low enough to cause the water to freeze out as ice crystals, provides a method of treating milk, particularly skimmed milk from which the cream has been removed, and whereby the milk can be concentrated with little or no absorption of gas, and whereby the milk concentrate thus produced can be reincorporated with a portion of the cream to form a final dehydrated milk product having the desired butter fat content. A homogenous concentrated milk product may thus be provided having a butter fat content of a selected value. The milk thus produced which has been dehydrated and admixed with cream, does not coagulate and thicken as in conventional heat dehydrated milk wherein cream is added.

It will be understood that the foregoing description and illustration of a suitable apparatus for carrying out the invention may be modified as to details by those skilled in the art without departing from the spirit and scope of the invention, and such obvious variations and changes are intended to be covered in accordance with the scope of the appended claim.

What is claimed is:

In an apparatus for freeze dehydrating aqueous liquid food material and selected from the group consisting of milk and vegetable juices and containing solids in suspension, said apparatus comprising a container for holding said liquid comprising solid particles and water, an inlet opening for said container for the introduction of said liquid food material, an outlet chamber located in an integral lowermost section at the opposite end of said container, an opening in said lowermost section for removing concentrated liquid material, and a second opening for the discharge of ice crystals, means for introducing a gaseous nitrogen refrigerant directly into the body of said liquid which gaseous nitrogen refrigerant is at a temperature of between about 5 and 7° F. to freeze said water to ice crystals, said gaseous nitrogen refrigerant being inert, non-oxidizing and which does not adversely affect the food material being treated, means for comprising a blower and connecting conduits to said container for recovering and recirculating said gaseous refrigerant after flowing through said liquid food material, and means comprising a heat exchanger for cooling said gaseous nitrogen refrigerant and controlling the temperature of the same prior to circulating the same through said liquid, said gaseous refrigerant being introduced into said liquid in the form of jets spacedly arranged in said container and from which said gaseous nitrogen refrigerant is discharged at relatively high velocity, and means comprising a screen disposed in said lowermost section and adjacent said ice crystal discharge opening for screening and collecting the ice crystals, and conduit means communicating with said opening in said lowermost section for removing concentrated liquid and recirculating said liquid after being subjected to said gaseous refrigerant to recover a final liquid concentrate of relatively high Brix and between 40 and 65°.

References Cited in the file of this patent

UNITED STATES PATENTS

| | | |
|---|---|---|
| 1,991,384 | Field et al. | Feb. 19, 1935 |
| 2,020,719 | Bottoms | Nov. 12, 1935 |
| 2,287,966 | Brandt | June 30, 1942 |
| 2,764,488 | Slattery | Sept. 25, 1956 |
| 2,821,304 | Zarchin | Jan. 28, 1958 |
| 2,904,511 | Donath | Sept. 15, 1959 |

FOREIGN PATENTS

| | | |
|---|---|---|
| 70,507 | Norway | June 3, 1946 |